UNITED STATES PATENT OFFICE.

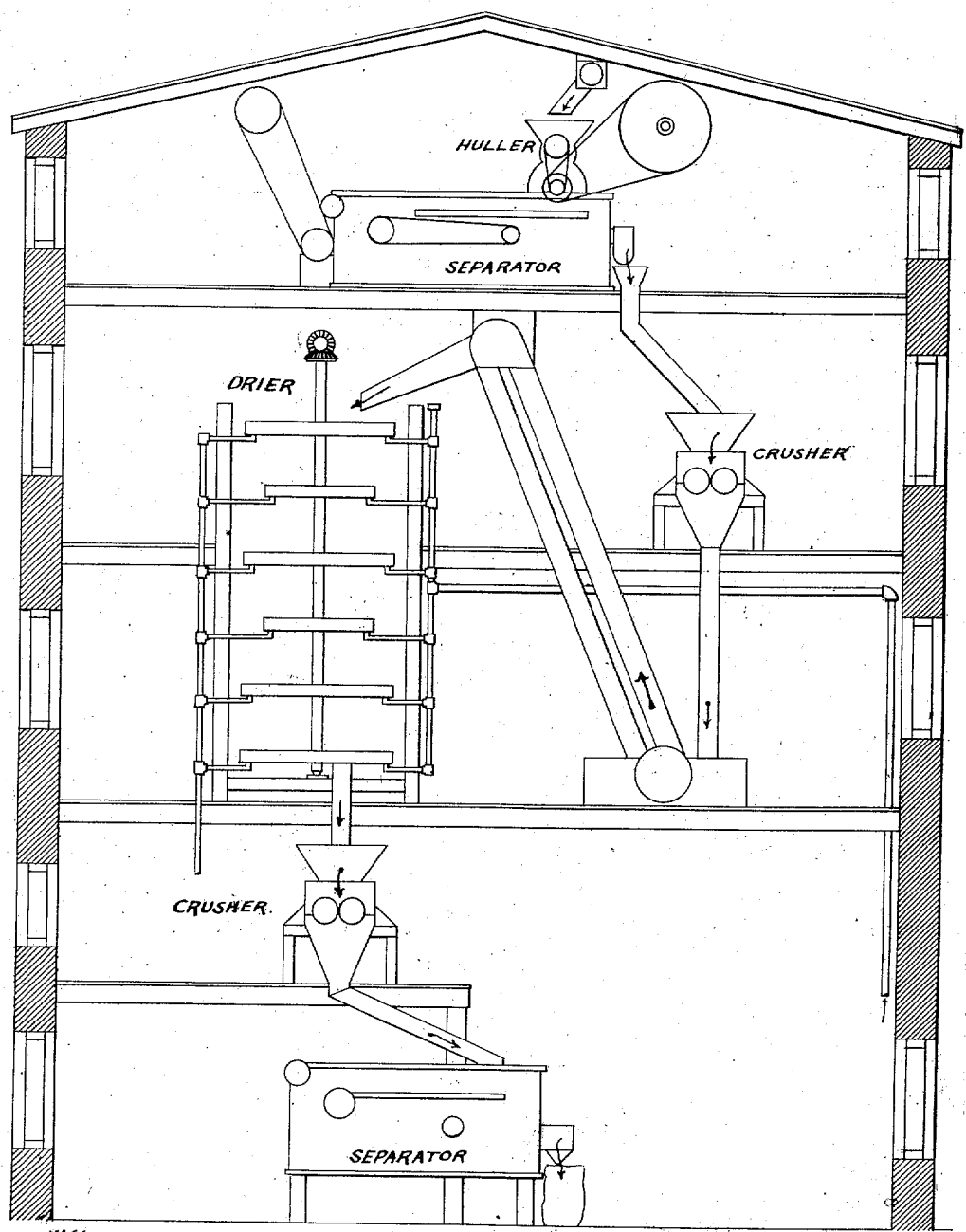

EDWIN L. JOHNSON, OF NEW YORK, N. Y.

MEAL FROM COTTON-SEED AND METHOD OF MAKING.

SPECIFICATION forming part of Letters Patent No. 421,575, dated February 18, 1890.

Application filed July 30, 1889. Serial No. 319,209. (No specimens.)

*To all whom it may concern:*

Be it known that I, EDWIN L. JOHNSON, a citizen of the United States, residing at New York, in the county of New York and State of New York, have invented certain new and useful Improvements in a Meal from Cotton-Seed and Method of Making Same, of which the following is a specification.

My invention relates to the production of a meal from cotton-seed, and has for its object the production of a meal that may be transported from place to place for the subsequent extraction of the oil.

All attempts to transport the raw kernels of cotton-seed, now called "cotton-seed meats," to a distance and there produce a good or uniform quality of product have failed, owing to moisture and germs in the kernels, which cause them to heat and ferment, always decomposing the oil and sometimes damaging and even destroying the value of the meal therefrom. Imperfect preparation and drying give the same bad results in a less degree. All these difficulties are completely removed by my process, in which I take the seed and convert them into a meal that shall contain all or nearly all the oil of the seed, the meal being capable of being kept for a very long time without deteriorating in value, and also capable of having the oil extracted subsequently, as desired.

The accompanying drawing illustrates the arrangement of the apparatus by means of which the process may be carried out; but as the said apparatus forms no part of the present invention I have not deemed it necessary to illustrate in detail the construction of the different mechanisms.

The manner of carrying out my process is as follows: Cotton-seed, with or without previous cleaning or linting, are crushed in any suitable manner, preferably by some means which will divide the seed as little as is compatible with good separation. The hulls are then separated from the kernels in any suitable manner. The kernels or "meats," as they are now commonly called, are next passed between rollers, where they are flattened out, the oil-cells being in a measure broken up and the oil spread evenly throughout the meats.

It is almost an impossibility to dry the meats thoroughly, so that no fermentation will ensue without flattening out the kernels, so difficult is it to drive out the moisture mingled with the oil (as it is in cotton-seed) when protected from the direct action of the heat by the least thickness of kernel. Meats apparently dry when rolled plainly show the moisture contained, and this moisture is sufficient to decompose the oil in the meats.

The great advantage of flattening the meats and distributing the oil evenly throughout the entire mass lies in the fact that I am enabled to dry them with less heat and more evenly and expeditiously than can be done when this step is not employed, and that too without burning the fine particles of the meats. Any steaming of the meats, either in their own or added moisture, tends to fix the deep coloring-matter of the seed in the oil and should be avoided; hence, the meats should be dried quickly and the vapors allowed to escape freely. The meats are next dried in any suitable drier, but preferably without the use of air, which has a tendency to oxidize them. I have found a series of steam-jacketed disks arranged one above another, so that the meats may find their way gradually from top to bottom of the series, to act well, the meats being heated slightly above 212° Fahrenheit from five to twenty minutes. The degree of heat employed and the length of time the meats are subjected to the heat will of course vary according to the amount of moisture contained in the meats, and consequently I do not wish to limit myself to the use of any particular amount of heat, nor to any particular length of time for the drying. After drying the meats are again passed between rollers, where they are further broken up and reduced to a final meal, the rollers serving still further to press the oil evenly throughout the entire mass of dried meats, which, as before stated, contributes largely to the preservation of the meats.

After the first breaking of the kernels and hulls the latter are, as before stated, removed; but in spite of this small particles of the hull, which contain no lint, will be found to be present in the meal after the drying and crushing. It is therefore desirable to screen the ground and dried meal, so as to remove these particles of the hull which detract from the appearance of the meal, and which also darken the oil and cake in process of manufacture.

I have found by actual tests that cotton-seed meal produced in accordance with this process contains from thirty-two and one-half to thirty-six per cent. of oil and that the meal will keep sweet and uninjured long enough for transportation by land or sea in ordinary meal-bags.

My method of making cotton-seed meal is peculiarly adapted for working in connection with the plantation-hullers, as there is no danger of the product spoiling, and it may be shipped at the convenience of the planter.

The meal presents a uniform and good marketable appearance and unlike the seed or crude meats may be readily tested for the percentage of oil contained.

Having described my invention, what I claim is—

1. The improvement in the manufacture of meal from cotton-seed, which consists in the following steps, to wit: hulling the seed and separating the hulls from the kernels, rolling the kernels, and finally drying the flattened kernels.

2. The improvement in the process of manufacturing meal from cotton-seed, which consists of the following steps, to wit: hulling the seed and separating the hulls from the kernels, rolling the kernels, drying the flattened kernels, and finally rolling or grinding the dried product.

3. The improvement in the process of manufacturing a meal from cotton-seed, which consists, first, in crushing the seed; second, separating the hulls from the kernels; third, rolling the kernels; fourth, drying the reduced kernels; fifth, regrinding, and, sixth, rebolting.

4. The improvement in the process of manufacturing meal from cotton-seed, which consists, first, of rolling or flattening the previously hulled and separated kernels, and, second, rapidly drying the flattened kernels.

5. The product herein described, consisting of cotton-seed meal free from hull and moisture and having all the contained oil (forming about thirty-three per cent. of the meal) thoroughly and evenly distributed through its particles.

In witness whereof I hereunto set my hand in the presence of two witnesses.

EDWIN L. JOHNSON.

Witnesses:
 JNO. R. GARISON,
 CHAS. W. KIRBY, Jr.